United States Patent [19]
Johnson et al.

[11] Patent Number: 5,560,754
[45] Date of Patent: Oct. 1, 1996

[54] REDUCTION OF STRESSES IN THE POLYCRYSTALLINE ABRASIVE LAYER OF A COMPOSITE COMPACT WITH IN SITU BONDED CARBIDE/CARBIDE SUPPORT

[75] Inventors: David M. Johnson, Westerville; Francis R. Corrigan, Columbus, both of Ohio

[73] Assignee: General Electric Company, Worthington, Ohio

[21] Appl. No.: 489,877

[22] Filed: Jun. 13, 1995

[51] Int. Cl.⁶ .................................................. B24D 3/00
[52] U.S. Cl. .................................. 51/297; 51/293; 51/309
[58] Field of Search ........................... 51/297, 292, 309

[56] References Cited

U.S. PATENT DOCUMENTS

| | | |
|---|---|---|
| 2,941,241 | 6/1960 | Strong . |
| 2,941,248 | 6/1960 | Hall . |
| 2,947,611 | 8/1960 | Bundy . |
| 2,947,617 | 8/1960 | Wentorf, Jr. . |
| 3,030,662 | 4/1963 | Strong . |
| 3,136,615 | 6/1964 | Bovenkerk et al. . |
| 3,141,746 | 7/1964 | DeLai . |
| 3,233,988 | 2/1966 | Wentorf, Jr. et al. . |
| 3,609,818 | 10/1971 | Wentorf, Jr. . |
| 3,743,489 | 7/1973 | Wentorf, Jr. et al. . |
| 3,745,623 | 7/1973 | Wentorf, Jr. et al. . |
| 3,767,371 | 10/1973 | Wentorf, Jr. et al. . |
| 3,850,591 | 11/1974 | Wentorf, Jr. . |
| 3,852,078 | 12/1974 | Wakatsuki et al. . |
| 3,876,751 | 4/1975 | Alexeevsky et al. . |
| 3,918,219 | 11/1975 | Wentorf, Jr. et al. . |
| 4,188,194 | 2/1980 | Corrigan . |
| 4,289,503 | 9/1981 | Corrigan . |
| 4,334,928 | 6/1982 | Hara et al. . |
| 4,394,170 | 7/1983 | Sawaoka et al. . |
| 4,401,443 | 8/1983 | Lee et al. ........................ 51/309 |
| 4,403,015 | 9/1983 | Nakai et al. . |
| 4,411,672 | 10/1983 | Ishizuka ......................... 51/309 |
| 4,414,178 | 11/1983 | Smith, Jr. et al. . |
| 4,440,573 | 4/1984 | Ishizuka ......................... 51/309 |
| 4,527,998 | 7/1985 | Knemeyer . |
| 4,605,343 | 8/1986 | Hibbs, Jr. et al. . |
| 4,673,414 | 6/1987 | Lavens et al. . |
| 4,797,326 | 1/1989 | Csillag . |
| 4,807,402 | 2/1989 | Rai . |
| 4,899,922 | 2/1990 | Slutz et al. . |
| 4,954,139 | 9/1990 | Cerutti . |
| 5,129,918 | 7/1992 | Chattopadhay ................ 51/309 |
| 5,543,105 | 9/1995 | Middlemiss et al. ........... 51/309 |

Primary Examiner—Deborah Jones

[57] ABSTRACT

The present invention is directed to polycrystalline diamond and cubic boron nitride (CBN) composite compacts and a method of making the same under high temperature/high pressure (HP/HT) processing conditions, and more particularly to HP/HT polycrystalline composite compacts having reduced abrasive layer stresses. The method of the invention involves making a metal carbide supported polycrystalline composite compact under conditions of high pressure and high temperature (HP/HT) in an HP/HT apparatus by the following steps:

(a) placing within an enclosure a mass of abrasive particles, a first mass of metal carbide support material adjacent said abrasive particles, and a second mass of metal carbide support material adjacent said first mass with a layer of brazing filler alloy having a liquidus above about 700° C. between said first and second masses;

(b) subjecting said enclosure to said HP/HT conditions for a time sufficient to form a composite compact wherein said first carbide support is bonded to said second carbide support; and (c) recovering said composite compact.

The resulting composite compact exhibits reduced abrasive table stresses such as result from the HP/HT processing conditions, and especially for composite compacts with thick carbide supports.

11 Claims, 2 Drawing Sheets

REDUCTION OF STRESSES IN THE POLYCRYSTALLINE ABRASIVE LAYER OF A COMPOSITE COMPACT WITH IN SITU BONDED CARBIDE/CARBIDE SUPPORT

BACKGROUND OF THE INVENTION

The present invention relates to polycrystalline diamond and cubic boron nitride (CBN) compacts made under high pressure/high temperature (HP/HT) processing conditions, and more particularly to HP/HT polycrystalline composite compacts having reduced stresses inherent in a supported compact structure.

A compact may be characterized generally as an integrally-bonded structure formed of a sintered, polycrystalline mass of abrasive particles, such as diamond or CBN. For many applications, however, it is preferred that the compact is supported by its bonding to a substrate material to form a laminate or composite compact arrangement. Typically, the substrate material is provided as a cemented metal carbide which comprises, for example, tungsten, titanium, or tantalum carbide particles, or a mixture thereof, which are bonded together with a binder of about 6% to about 25% by weight of a metal such as cobalt, nickel, or iron, or a mixture or alloy thereof. As is shown, for example, in U.S. Pat. Nos. 3,381,428; 3,852,078; and 3,876,751, compacts and composite compacts have found acceptance in a variety of applications as parts or blanks for cutting and dressing tools, as drill bits, and as wear parts or surfaces.

The basic method for manufacturing the polycrystalline compacts and composite compacts of the type described herein involves the placing of an unsintered mass of abrasive, crystalline particles, such as diamond or CBN, or a mixture thereof, within a protectively shielded metal enclosure which is disposed within the reaction cell of a HP/HT apparatus of a type described further in U.S. Pat. Nos. 2,947,611; 2,941,241; 2,941,248; 3,609,818; 3,767,371; 4,289,503; 4,673,414; and 4,954,139, the disclosures of which are expressly incorporated herein by reference. Additionally placed in the enclosure with the abrasive particles may be a metal catalyst if the sintering of diamond particles is contemplated, as well as a pre-formed mass of a cemented metal carbide for supporting the abrasive particles and thereby form a composite compact therewith. The contents of the cell then are subjected to processing conditions selected as sufficient to effect intercrystalline bonding between adjacent grains of the abrasive particles and, optimally, the joining of the sintered particles to the cemented metal carbide support. Such processing conditions generally involve the imposition for about 3 to 120 minutes of a temperature of at least 1300° C. and a pressure of at least 50 kbar.

As to the sintering of polycrystalline diamond compacts or composite compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed in to shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

Under the specified HP/HT conditions, the metal catalyst, in whatever form provided, is caused to diffusely advance or "sweep" through the dense diamond crystalline mass, and thereby is made available as a catalyst or solvent for recrystallization or crystal intergrowth. The HP/HT conditions, which operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the composite compact is at least about 70% by volume. Methods for making diamond compacts and composite compacts are more fully described in U.S. Pat. Nos. 3,141,746; 3,745,623; 3,609,818; 3,850,591; 4,394,170; 4,403,015; 4,797,326; and 4,954,139, the disclosures of which are expressly incorporated herein by reference.

As to polycrystalline CBN compacts and composite compacts, such compacts and composite compacts are manufactured in general accordance with the methods suitable for diamond compacts. However, in the formation of a CBN compacts via the previously described "sweep-through" method, the metal which is swept through the crystalline mass need not necessarily be a catalyst or solvent for CBN recrystallization. Accordingly, a polycrystalline mass of CBN may be joined to a cobalt-cemented tungsten carbide substrate by the sweep through of the cobalt from the substrate and into the interstices of the crystalline mass notwithstanding that cobalt is not a catalyst or solvent for the recrystallization of CBN. Rather, the interstitial cobalt functions as a binder between the polycrystalline CBN compact and the cemented tungsten carbide substrate.

As it was for diamond, the HP/HT sintering process for CBN is effected under conditions in which CBN is the thermodynamically stable phase. It is speculated that under these conditions, intercrystalline bonding between adjacent crystal grains also is effected. The CBN concentration in the compact or in the abrasive table of the composite compact, again, is preferably at least about 70% by volume. Methods for making CBN compacts and composite compacts are more fully described in U.S. Pat. Nos. 2,947,617; 3,136,615; 3,233,988; 3,743,489; 3,745,623; 3,767,371; 3,831,428; 3,918,219; 4,188,194; 4,289,503; 4,334,928; 4,673,414; 4,797,326; and 4,954,139, the disclosures of which are expressly incorporated herein by reference.

Yet another form of a polycrystalline compact, which form need not necessarily exhibit intercrystalline bonding, involves a polycrystalline mass of diamond or CBN particles having a second phase of a metal or alloy, a ceramic, or a mixture thereof. The second material phase is seen to function as a bonding agent for the abrasive crystal particles. Polycrystalline diamond and polycrystalline CBN compacts containing a second phase of a cemented carbide material are exemplary of these so-called "conjoint" polycrystalline abrasive compacts.

With respect to composite compacts, it is speculated, as is detailed in U.S. Pat. No. 4,797,326, that the bonding of the support to the polycrystalline abrasive mass involves a physical component in addition to a chemical component which develops at the bond line if the materials forming the respective layers are interactive. The physical component of bonding is seen to develop from the relatively lower CTE (coefficient of thermal expansion) of the polycrystalline abrasive layer as compared to the cemented metal support layer. That is, upon the cooling of the composite compact blank from the HP/HT processing conditions to ambient conditions, it has been observed that the support layer retains residual tensile stresses which, in turn, exert a radial compressive loading on the polycrystalline compact supported thereon. This loading maintains the polycrystalline compact in compression, which compression assists in securing the compact to the support and improves fracture toughness, impact, and shear strength properties of the composite.

In the commercial production of supported compacts, however, it is common for the product or blank which is recovered from the reaction cell of the HP/HT apparatus to be subjected to a variety or finishing operations which include cutting, such as by electrode discharge machining or with lasers, milling, and especially grinding to remove any adherent shield metal from the outer surfaces of the compact. Such finishing operations additionally are employed to machine the compact into a cylindrical shape or the like which meets product specifications as to diamond or CBN abrasive table thickness and/or carbide support thickness. Especially with respect to diamond and CBN composite compacts, a substantially uniform abrasive layer thickness is desirable since the abrasive tables on the blanks are often machined by the user into final products having somewhat elaborate configurations, e.g., saw-toothed wedges, which are tailored to fit particular applications. It will be appreciated, however, that during such finishing operations, the temperature of the blank, which previously has been exposed to a serve thermal cycle during its HP/HT processing and cooling to room temperature, can be elevated due to the thermal effects of grinding or cutting operations. Moreover, the blank or product finished therefrom may be mounted onto a variety of cutting or drilling tools using braze techniques which again subjects the compacts and supports to thermal gradients and stresses. During each of the thermal cycles of the composite blank, the carbide support, owing to its relatively higher coefficient of thermal expansion (CTE), will have expanded to a greater extent than the abrasive compact supported thereon. Upon cooling, the residual stresses generated during heating are relieved principally through the deformation of the abrasive material which results in stress cracking and nonuniformities in the thickness of the abrasive table layer.

As the composite compacts heretofore known in the art have garnered wide acceptance for use in cutting and dressing tools, drill bits, and the like, it will be appreciated that any improvements in the strength and machining properties of such materials would be well-received by industry. Especially desired would be diamond and CBN composite compacts having improved fracture toughness, impact, and shear strengths which would expand the applications for such material by enhancing their machinability, performance, and wear properties. Thus, there has been and heretofore has remained a need for diamond and CBN composite compacts having improved physical properties.

BROAD STATEMENT OF THE INVENTION

The present invention is directed to polycrystalline diamond and cubic boron nitride (CBN) composite compacts and a method of making the same under high temperature/high pressure (HP/HT) processing conditions, and more particularly to HP/HT polycrystalline composite compacts having reduced abrasive layer stresses. The method of the invention involves making a metal carbide supported polycrystalline composite compact under conditions of high pressure and high temperature (HP/HT) in an HP/HT apparatus, which comprises the steps of:

(a) placing within an enclosure a mass of abrasive particles, a first mass of metal carbide support material adjacent said abrasive particles, and a second mass of metal carbide support material adjacent said first mass with a layer of brazing filler alloy having a liquidus above about 700° C. between said first and second masses;

(b) subjecting said enclosure to said HP/HT conditions for a time sufficient to form a composite compact wherein said first carbide support is bonded to said second carbide support; and (c) recovering said composite compact.

The resulting composite compact exhibits reduced abrasive table stresses, such as, result from the HP/HT processing conditions and especially for composite compacts with thick carbide supports.

Advantages of the present invention include diamond or CBN composite compact blanks which may be made in conventional HP/HT process apparatuses, but which may be better machined, brazed, or otherwise finished in conformance with product specifications without stress cracking. Another advantage is the ability to reduce abrasive table stresses for composite compacts with thick carbide supports. A further advantage is the expected improvement in performance of the inventive blanks by virtue of the reduced abrasive table stresses. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

In the discourse to follow, the precepts of the present invention are illustrated in connection with a conventional HP/HT apparatus which may be of the belt- or die-type described, for example, in U.S. Pat. Nos. 2,947,611; 2,941, 241; 2,941,248; 3,609,818; 3,767,371; 4,289,503; 4,673, 414; and 4,954,139. However, it will be appreciated that the method of the invention will find applicability in any HP/HT apparatus of a general type which is capable of providing the required HP/HT conditions. Accordingly, it is intended that such other HP/HT apparatuses are within the scope of the invention herein described.

Figure 1:
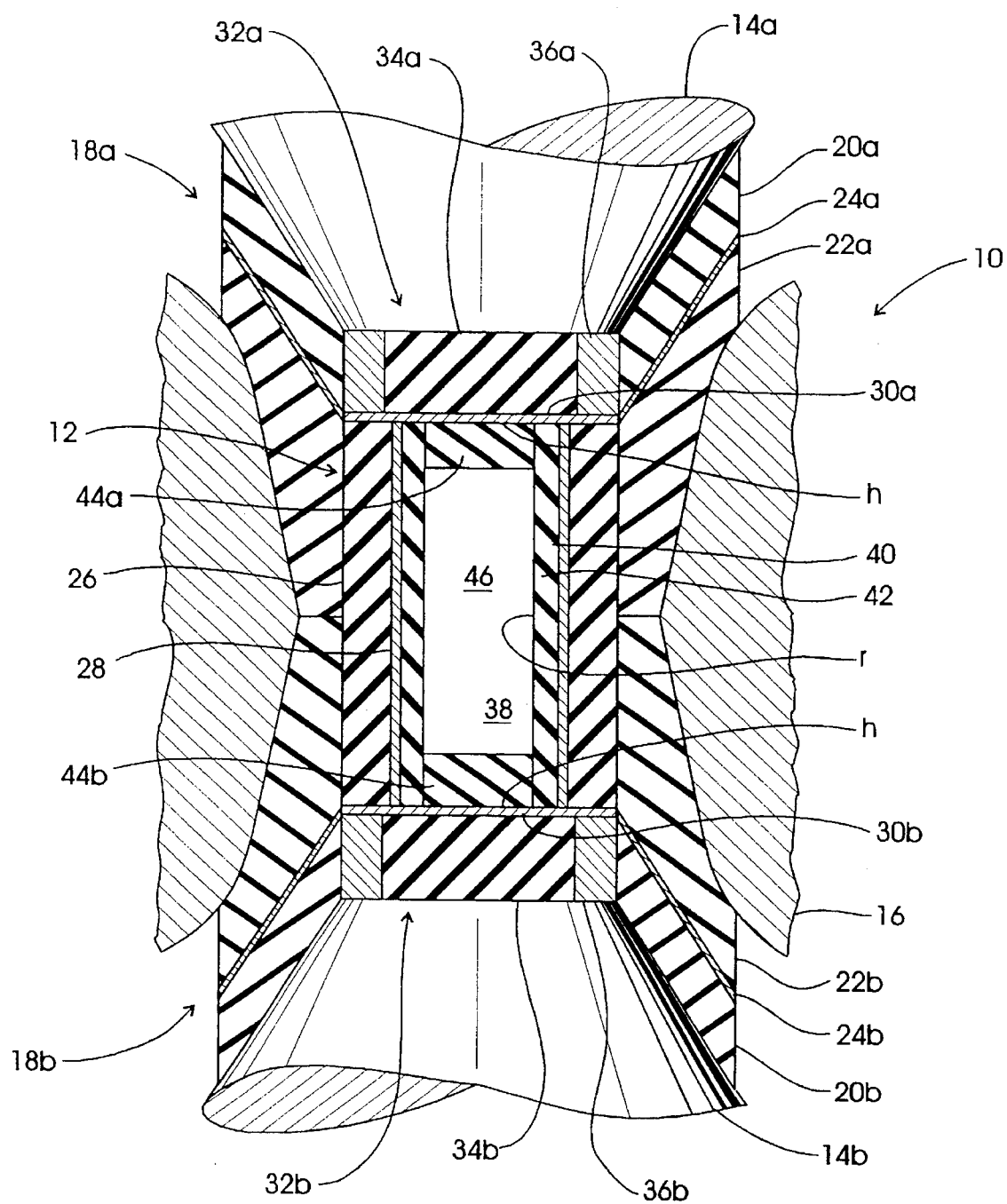
FIG. 1 is a cross-sectional view of a conventional HP/HT apparatus which may be utilized to prepare the composite compacts of the present invention.

Looking then to FIG. 1, an illustrative HP/HT apparatus useful in conjunction with the present invention is shown generally at 10 to comprise a generally cylindrical reaction cell assembly, 12, interposed between a pair of punches, 14a and 14b, and surrounded by a generally annular belt or die member, 16. Preferably, both punches 14 and belt member 16 are formed of a relatively hard material such as a cemented tungsten carbide. Between punches 14 and belt member 16 are a pair of insulating assemblies, 18a and 18b, each of which is formed of a pair of thermally- and electrically-insulating members, 20a–b and 22a–b, each preferably formed of pyrophyllite or the like and having an intermediate metallic gasket, 24a and 24b, disposed therebetween.

As shown, reaction cell assembly 12 includes a hollow cylinder, 26, which may be formed of a material such as salt or the like which is converted during HP/HT by phase transformation or compaction to a stronger, stiffer state, or, alternative of a talc material or the like which is not so converted. In either case, the material of cylinder 12 is selected has being substantially free of volume discontinuities or the like under HP/HT as may occur, for example, with pyrophyllite or alumina materials. Materials meeting such criteria are described in U.S. Pat. No. 3,030,662.

Positioned concentrically within salt cylinder 26 is an adjacent cylinder, 28, which is provided as a graphite electrical resistance heater tube. Electrical connection with heater tube 28 is achieved via an adjacent pair of conductive-metal end discs, 30a and 30b, which are axially-disposed with respect to heater tube 28. Adjacent each disc 30 is provided an end cap assembly, shown generally at 32a and 32b, each of which comprises an insulating plug, 34a and 34b, surrounded by an electrically conductive ring, 36a and 36b.

It will be appreciated that the interior of heater 28, along with end discs 30, salt cylinder 26, and end cap assemblies 32, defines a generally-cylindrical inner chamber, shown at 38 containing a pressure transmitting medium, 40. Pressure transmitting medium 40 is selected as having a relatively low coefficient of internal friction to make it semi-fluid at HP/HT conditions, and may be provided as a cylindrical salt liner, 42, which is fitted with an axial pair of salt plugs, 44a and 44b. Preferably, salt liner 42 and plugs 44 are formed of a sodium chloride, but also may be formed of any chloride, iodide, or bromide of sodium, potassium, or calcium, or a mixture thereof. Alternatively, pressure transmitting medium 40 may be provided in a powdered or particulate form. In either case, medium 40 defines a cavity space, as is shown at 46, which is configured to receive a charge assembly, 50, which is illustrated in a somewhat enhanced detail in FIG. 2.

Figure 2:
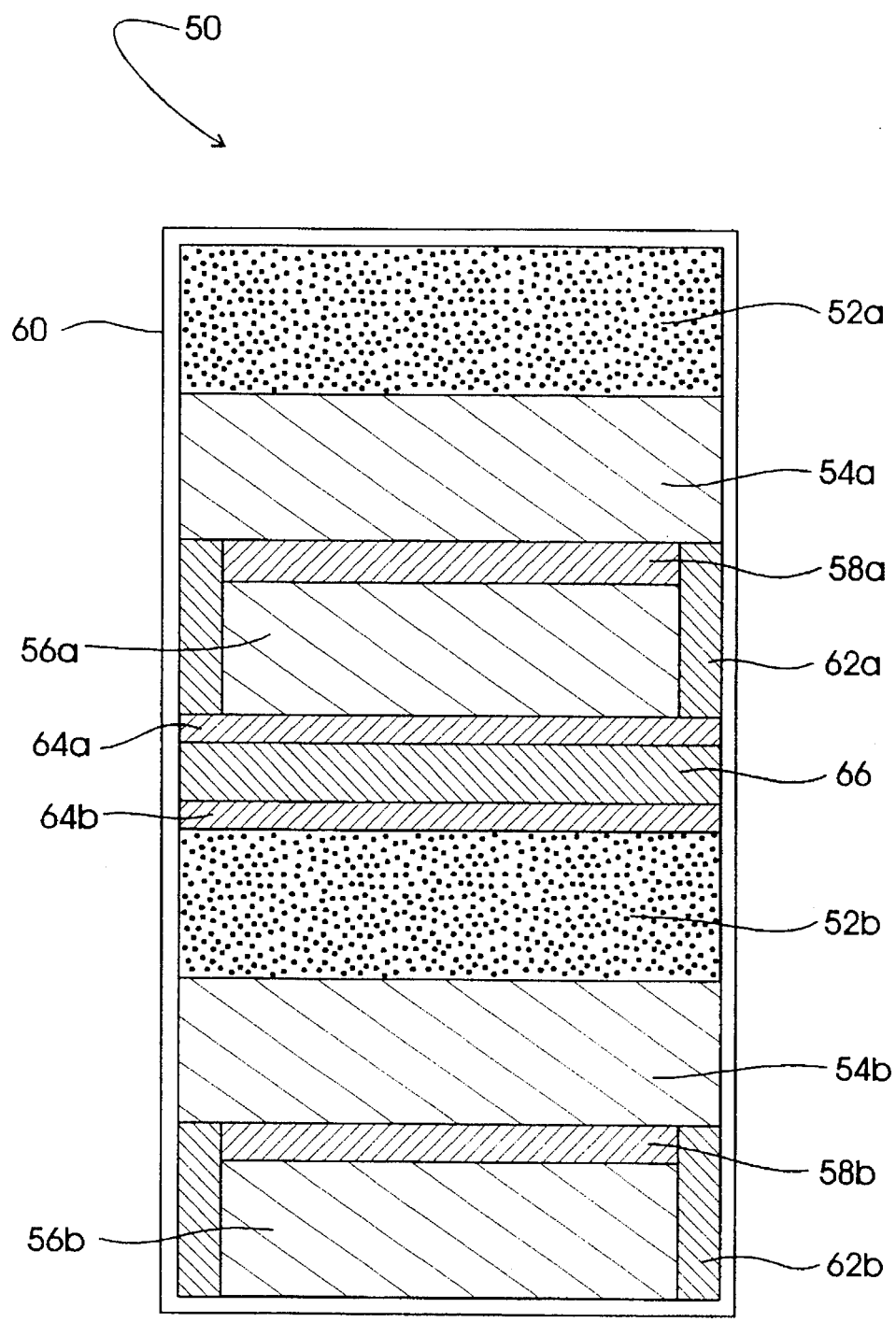
FIG. 2 shows in cross-section an exemplary charge assembly configured for use within the reaction cell of the HP/HT apparatus of FIG. 1.

Looking additionally to FIG. 2, a representative charge assembly 50 configured to be received in cavity space 46 of reaction cell 12 (FIG. 1) is shown to contain two sub-assemblies provided in a stacked arrangement for preparing a plurality of disc- or cylindrically-shaped composite compacts, although a greater number of such subassemblies may be form charge assembly 50 as is known in this art. Each subassembly is shown to comprise a mass of crystalline diamond or CBN particles, 52a and 52b, which particles may range in diameter from less than a micron to greater than 100 microns, and which are supported on a pre-sintered layer of a cemented metal carbide, 54a and b, respectively. Carbide layers 56a and 56b are placed adjacent carbide layers 54a and b, respectively. Carbide layers 54 and 56 may comprise, for example, tungsten, titanium, tantalum, or molybdenum carbide particles, or mixtures thereof, and a metal binder such as cobalt, nickel, or iron, or a mixture or alloy thereof. Although pre-sintered metal carbide layers 54 and 56 are preferred for setup convenience, layers of a sinterable carbide powder admixed with a powdered metal binder may be substituted. For masses 52a and b of diamond particles, the metal binder of the cemented metal carbide support layers 54a and b preferably is selected as being a diamond catalyst or solvent such as cobalt, iron, nickel, ruthenium, rhodium, palladium, platinum, chromium, manganese, tantalum, osmium, iridium, or a mixture or alloy thereof which, under HP/HT conditions, is made to diffusely advance or "sweep" through the dense crystalline masses 52. In this manner, the metal thereby is made available as a catalyst or solvent for recrystallization or crystal intergrowth of the diamond. Alternatively, the diamond catalyst or solvent may be admixed with the crystalline diamond particles of masses 52, or provided in separate layers placed adjacent masses 52 or interposed between masses 52 and carbide support layers 54.

Interposed between carbide layers 54 and 56 are brazing filler alloy 58a and 58b which preferably have a liquidus above about 700° C. A wide variety of brazing alloys should function efficaciously, though high liquidus brazing alloys are preferred. Referring to the brazing alloys having a liquidus greater than 700 ° C. and which are useful in accordance with the precepts of the present invention, a wide variety of such braze alloys are known in the art. For example, Anaconda 773 filler metal (copper 50%, zinc 40%, nickel 10%, melting point range 950°–960° C.) can be used, though it has been reported to undesirably react with carbide pieces being joined, so that its use may not be recommended. Another brazing filler metal which has been proposed is TiCuSil (Ti-4.5%, Cu-26.7%, Ag-balance, melting point range 840°–850° C.). Other alloys include a palladium (28–32%), chromium (6%–13%), boron (1%–3.5%), and nickel (balance) brazing alloy described and claimed in U.S. Pat. No. 4,414,178. This alloy is described as being capable of brazing in the 982°–1093° C. temperature range. Additionally, U.S. Pat. No. 4,527,998 discloses additional gold-based alloys as follows: gold (18%–39.5%), nickel (3.5%–14.5%), palladium (2.5%–10.5%), manganese (7.5%–9.0%), and copper (balance). Most brazing alloy compositions reported within these ranges have liquidus between 900° and 1,000° C. Finally, U.S. Pat. No. 4,899, 9225 proposes the use of brazing alloys having a liquidus above 700° C.

Alternatively, various metals that form lower melting (compared to cobalt) alloys with cobalt could be used to bond the carbide layers, e.g., Al, Sn, Sb, Si, Ti, and Ta. These metals could be used as powders or as foils placed between the two or more carbide layers.

The sub-assemblies of charge assembly 50 are contained in a shielded cylindrical sleeve, 60, which preferably is formed of a refractory metal such as zirconium, titanium, tantalum, tungsten, or molybdenum, or, alternatively, of another refractory material such as mica, alumina, salt, or a mixture thereof. Second sleeves, 62a and 62b, are placed adjacent each lower carbide layer 56a and 56b and adjacent brazing filler alloys 58a and 58b in order to prevent the brazing filler alloy from migrating into the abrasive particles. Each of the sub-assemblies contained in shield sleeve 62 may be separated by additional shielding discs, discs 64a and 64b, which separates carbide layer 56a from diamond table 52b. As charge assembly 50 is designed as having a studied, mechanical instability, pressure transmitting layer 66 is selected as being semi-fluid under HP/HT conditions to accommodate for the reduction in volume of each sub-assembly during processing. It will be appreciated that additional configurations of charge assembly 50 can be used as is necessary, desirable, or convenient in conventional fashion, such as, for example, those shown in U.S. Pat. Nos. 4,605,343 and 4,807,402, the disclosures of which are expressly incorporated herein by reference.

After the disposition of charge assembly 50 into cavity 46 of reaction cell 12, heat from heater tube 28 and a generally axial pressure from punches 36 are applied to the contents of reaction cell 12 for a time sufficient to effect the sintering or intercrystalline bonding of particle masses 52 into integral abrasive bodies or polycrystalline compacts which are essentially free of voids, and the direct bonding of these compacts to their underlying cemented metal carbide supports 54. The direct bonding relationship of the supports by the bonding layer therebetween also occurs during the HP/HT processing. Broadly, the HP/HT conditions under which apparatus 10 is operated are selected as being within the thermodynamic region wherein diamond or CBN is the stable phase and whereat significant reconversion, i.e., graphitization, of the crystalline diamond, or CBN particles does not occur. In this regard, for diamond, apparatus 10 is operated at a temperature of at least about a 1000° C., but preferably from between about 1000° C. to about 2000° C., and at a pressure of at least about 5 kbar, but preferably from between about 40 to about 80 kbars. These same HP/HT conditions generally hold for the processing of CBN as well, although it should be noted that the preferred temperatures and pressures specified herein are estimates only due to the difficulties attending the accurate and precise measurement of the high temperatures and pressures necessary for diamond or CBN processing. In addition, the pressure and temperature values specified need not remain constant during processing, but may be varied to define predetermined heating, cooling, and/or pressure schedules. It is known that such variances may affect the ultimate physical properties of the product.

As will be shown in connection with the Example to follow, a composite compact formed by the inventive method will have a residual surface stresses which are less than the residual surface stress for an equivalent composite compact having the same total carbide support layer thickness resulting from a single such layer. The high residual stress levels in the abrasive table of the composite compacts that are believed to contribute to stress corrosion cracking experienced by thick (e.g., greater than about 1:1 aspect ratio of thickness to height) carbide blanks during subsequent brazing operations where the compact is attached to a toll are lessened by the invention which should mean less failure of the composite compacts during tool formation as well as in field use.

The Example to follow, wherein all percentages and proportions are by weight unless otherwise expressly indicated, are illustrative of the practicing of the invention herein involved, but should not be construed in any limiting sense. All citations referred to herein are expressly incorporated herein by reference.

EXAMPLE

A number of polycrystalline diamond composite compacts with in situ brazed carbide/carbide bonds were prepared by the HP/HT process as described above at a pressure of about 45–55 kbars and temperature of about 1300°–1400° C. for about 5 to 15 minutes. The construction of the sub-assemblies was like that described in connection with FIG. 2 wherein a zirconium cup was charged with diamond grit (25 gm average particle size), an upper carbide disc 0.124 in thick and a lower carbide disc 0.216 in thick (13 to 16 wt-% Co) with a NiCuSiL 3 braze foil (GTE Wesgo Inc., Belmont, Calif.) inserted between the two carbide discs. A second tantalum cup surrounded the lower carbide disc and the braze foil. Additional composite compact samples were made using a single 0.340 in thick carbide discs and no brazing filler alloy. After the composite compacts were recovered from the press, they were ground to remove the cup material and the diamond tables lapped flat.

One of the inventive samples was axially cut into two pieces and inspected with a microscope. This visual microscopic inspection revealed an increase in the carbide/carbide bond thickness from the center of the compact to the periphery of the sample.

A triple rectangular stacked rosette strain gage (WA-03-030WR-120 gage, Measurements Group, Inc., Raleigh, N.C.) was bonded to the center of the diamond table of each sample. The sample then was mounted in a wire electrode discharge machine (WEDM) the strain gage leads connected to a strain indicator unit and balanced to zero for all three elements of the strain gage. The sample was WEDM cut at the diamond table/carbide interface to completely remove the carbide substrate and, thus, relieve the residual stresses in the compact. Residual strains were measured for each element of the swain gage for the cut samples.

The residual stress originally present at the surface of the composite compact abrasive layer (at the center of the abrasive layer) was calculated from the measured strains by employing Hooke's law (see Tech Note # TN-515, Measurements Group, Inc.) with an elastic modulus of $1.51 \times 10^8$ psi and Poisson's ratio of 0.078 for the diamond table. The results for the average residual stress in the in situ brazed and the unitary carbide samples are set forth below.

TABLE

| SAMPLE NO. | SAMPLE TYPE | RESIDUAL STRESS (Compressive - PSI) |
| --- | --- | --- |
| IS1 | In-situ brazed | −58,620 |
| STD1 | Unitary | −90,553 |
| STD2 | Unitary | −84,014 |
| STD3 | Unitary | −79,838 |
| STD4 | Unitary | −85,442 |
| STD5 | Unitary | −88,585 |

These results show a reduction in the measured stress of the in situ brazed carbide sample compared to the unitary carbide samples. In fact, the average residual stress for the unitary samples was −85,686 psi. Thus, the inventive in situ brazed carbide sample had a residual stress that was over 31% less than the average residual stress for the unitary samples tested.

It is anticipated that certain changes may be made in the foregoing methods and products without departing from the scope of the invention herein involved. In this regard, it will be appreciated that, based upon the characterization of the preferred residual surface stress distribution herein provided, other methodologies for effecting such a distribution will become obvious. Such methodologies would include, for example, imposing an axial and/or radial temperature gradient across the blank, or by otherwise providing for a non-isothermal cooling of the blank from the HP/HT conditions of its processing. Other methodologies might involve interposing an intermediate layer between the compact and the support layers, the intermediate layer selected as having a significantly different coefficient of thermal expansion than either the abrasive or carbide layer, or the varying of the coefficient of thermal expansion across the carbide and/or the abrasive layer. Accordingly, it is intended that all matter contained in the foregoing description of the present invention or shown in the accompanying drawings shall be interpreted as illustrative rather than as limiting.

I claim:

1. Method for making a metal carbide supported polycrystalline composite compact under conditions of high pressure and high temperature (HP/HT) in an HP/HT apparatus, which comprises the steps of:

(a) placing within an enclosure a mass of abrasive particles, a first mass of metal carbide support material adjacent said abrasive particles, a second mass of metal carbide support material adjacent said first mass, and a layer of brazing filler alloy having a liquidus above about 700° C. between said first and second support masses;

(b) subjecting said enclosure to said HP/HT conditions for a time sufficient to form a composite compact wherein said first carbide support is bonded to said second carbide support by said brazing filler alloy; and (c) recovering said composite compact.

2. The method of claim 1, wherein said HP/HT conditions include a pressure of at least about 5 kbars and a temperature of at least about 1,000° C.

3. The method of claim 1, wherein said mass of abrasive particles comprises diamond particles.

4. The method of claim 1, wherein said mass of abrasive particles comprises cubic boron nitride particles.

5. The method of claim 1, wherein said first and said second metal carbide support material is selected from the group consisting of tungsten, titanium, tantalum, and molybderium carbide particles, and mixtures thereof.

6. The method of claims 5, wherein said first and said second metal carbide support material comprises a metal binder selected from the group consisting of cobalt, nickel, and iron, and mixtures and alloys thereof.

7. A metal carbide supported composite compact comprising a sintered polycrystalline compact layer bonded at an interface to a first metal carbide support layer which is in situ bonded to a second metal carbide support layer.

8. The composite compact of claim 7, wherein said polycrystalline compact layer comprises diamond.

9. The composite compact of claim 7, wherein said polycrystalline compact layer comprises cubic boron nitride.

10. The composite compact of claim 7, wherein both of said metal carbide support layers are selected from the group consisting of tungsten, titanium, tantalum, and molybdenum carbide, and mixtures thereof.

11. The method of claims 10, wherein both of said metal carbide support layers comprise a metal binder selected from the group consisting of cobalt, nickel, and iron, and mixtures and alloys thereof.

* * * * *